(12) United States Patent
Wolfe et al.

(10) Patent No.: US 10,726,211 B1
(45) Date of Patent: Jul. 28, 2020

(54) AUTOMATED SYSTEM FOR DYNAMICALLY GENERATING COMPREHENSIBLE LINGUISTIC CONSTITUENTS

(71) Applicant: AMAZON TECHNOLOGIES, INC., Seattle, WA (US)

(72) Inventors: Nikolas Wolfe, Pittsburgh, PA (US); John Thomas Beck, Bethel Park, PA (US); Lee Michael Bossio, Watertown, CT (US); Logan Gray Chittenden, Westbrook, CT (US); Matthew Darren Choate, Crafton, PA (US); Matthew Girouard, Pittsburgh, PA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 195 days.

(21) Appl. No.: 16/017,816

(22) Filed: Jun. 25, 2018

(51) Int. Cl.
*G06F 40/58* (2020.01)
*G10L 15/22* (2006.01)
*G10L 15/30* (2013.01)
*G10L 15/19* (2013.01)
*G10L 15/18* (2013.01)

(52) U.S. Cl.
CPC .......... *G06F 40/58* (2020.01); *G10L 15/1822* (2013.01); *G10L 15/19* (2013.01); *G10L 15/22* (2013.01); *G10L 15/30* (2013.01)

(58) Field of Classification Search
CPC ....................................................... G06F 40/58
USPC ......................................................... 704/257
See application file for complete search history.

(56) References Cited

U.S. PATENT DOCUMENTS

| | | | | |
|---|---|---|---|---|
| 6,778,949 B2* | 8/2004 | Duan | ..................... | G06F 40/268 704/2 |
| 8,275,603 B2* | 9/2012 | Furihata | .................. | G06F 40/45 704/4 |
| 9,916,538 B2* | 3/2018 | Zadeh | ..................... | G06N 7/005 |
| 10,055,400 B2* | 8/2018 | Allen | ..................... | G06F 40/253 |
| 10,061,770 B2* | 8/2018 | Allen | ..................... | G06F 40/58 |
| 10,394,851 B2* | 8/2019 | De Sousa Webber | | G06F 16/35 |
| 10,552,546 B2* | 2/2020 | Nelson | .................. | H04M 3/567 |
| 10,553,208 B2* | 2/2020 | Nelson | .................. | G06Q 10/10 |

* cited by examiner

*Primary Examiner* — Susan I McFadden
(74) *Attorney, Agent, or Firm* — Lindauer Law, PLLC

(57) ABSTRACT

Systems for facilitating acquisition of a language by a user receive initial user input representing a phrase in a first language. The phrase is translated to a second language then parsed to generate constituent data indicative of one or more groups of related words within the phrase. The constituents may constitute comprehensible linguistic inputs for communication to a user when the initial phrase is not a comprehensible input. Output data is generated to output the constituents to the user. Based on the relationships between the words, the characteristics of the second language, or user data indicative of the user's previous comprehension of constituents, the amplitude, frequency, output rate, or other audible characteristic of output may be modified to emphasize or deemphasize portions of the constituents.

20 Claims, 7 Drawing Sheets

AUTOMATED SYSTEM FOR DYNAMICALLY GENERATING COMPREHENSIBLE LINGUISTIC CONSTITUENTS

BACKGROUND

Systems for assisting users in learning languages typically utilize content that has been created or curated by an expert for a particular language, which is provided to a user in a scripted format.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
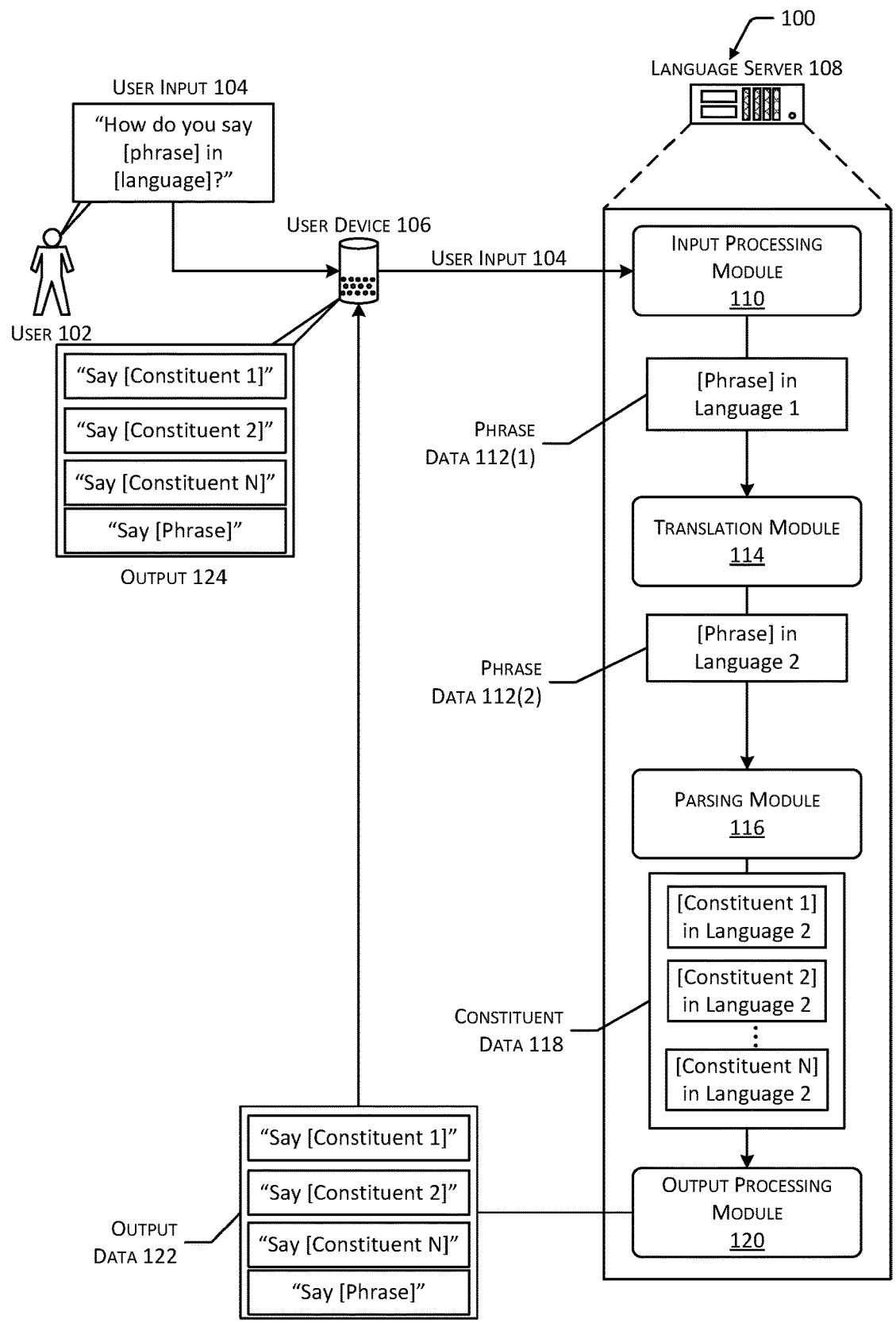
FIG. 1 depicts an implementation of a system for automatically converting a phrase that is input by a user to comprehensible constituents for output to the user in an alternate language.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Computerized or automated systems for assisting users in learning an unfamiliar language typically output audible instructions that communicate vocabulary, grammar, basic phrases and sentences, and other linguistic elements to a user. Some systems also prompt audible input from a user, such as by requesting a user to repeat a sentence, word, or phrase, and if the audible input deviates from an expected response, the user may be prompted to repeat the input until the input is correct. However, providing audio output to a user may not significantly facilitate the acquisition of a language if the audio output is not comprehensible. For example, rote memorization and repetition of vocabulary (e.g., single words) or long and complex sentences or phrases may not significantly increase a user's understanding of a language. Similarly, explicit instruction regarding grammatical rules and conventions, verb conjugation, and so forth may not effectively improve the user's understanding. As an alternative to such techniques, it has been hypothesized that providing a user with "comprehensible inputs" may facilitate a user's natural acquisition of a language more effectively than a user's conscious attempts to acquire the language. A comprehensible input may include a phrase that may be understood by a user, despite the user's lack of understanding of all of the words and grammatical structures within the input. For example, the context in which a phrase is used, along with audible and visible cues that accompany the use of the phrase, may facilitate a user's understanding of the phrase even when each individual word and grammatical structure is not fully understood. However, typical systems that provide comprehensible linguistic inputs to users require use of content that has been created or curated by an individual that is knowledgeable in the language, and such content is normally provided to the user in a scripted manner. These limitations preclude the use of an automated system to generate and provide comprehensible inputs to a user.

Described in this disclosure are techniques for converting an initial phrase into comprehensible constituents (e.g., groups of words that are related to one another) automatically, that may be used independent of the characteristics of the phrase, independent of the language in which the phrase is to be presented, and independent of the language used by the user seeking to learn the phrase. For example, a user may request, in his or her native language, to learn the English translation of the phrase "The bathroom is down the hall". In other implementations, a predetermined phrase may be accessed independent of user input. The phrase may be translated from the user's native language to the requested language. In other implementations, an existing translation of the phrase may be accessed without translating the initial phrase. The translation of the phrase may not, itself, constitute a comprehensible linguistic input due to the length or complexity of the phrase. For example, outputting the entire phrase "The bathroom is down the hall" to a user may not efficiently facilitate the user's acquisition of the English language.

As such, the phrase may be processed using a dependency parser to determine one or more constituents contained within the phrase. A constituent may include a group of words that share one or more grammatical relationships. For example, use of a dependency parser in conjunction with the phrase "The bathroom is down the hall" may indicate that the first instance of the article "the" depends upon the noun "bathroom" and the second instance of the article "the" depends upon the noun "hall". The dependency parser may also indicate that the noun "bathroom" depends upon the preposition "down", while the noun "bathroom" is associated with the verb "is". As a result, based on the initial phrase, a first constituent, "the bathroom is", and a second constituent, "down the hall", may be determined. Because the constituents are shorter and less complex than the initial phrase, and because the words within each constituent share one or more grammatical relationships, each constituent may individually constitute a comprehensible linguistic input. For example, output of a single constituent to a user may implicitly present grammatical structures and vocabulary to the user without explicitly explaining the grammatical structures or vocabulary, and the user's understanding of the context surrounding the constituent may facilitate the user's understanding of the language.

Therefore, audio output that includes the first constituent (e.g., the clause "The bathroom is", presented in English) may be generated. The audio output may include a prompt requesting that the user provide audio input repeating the first constituent. In some implementations, if the received audio input does not correspond to the audio output within a threshold level of similarity, the audio output may be repeated and the user may be prompted to provide additional audio input. In some implementations, the audio output provided in response to incorrect user input may be modified to emphasize portions of the output. For example, if a user mispronounces the word "bathroom", audio output may be generated that includes pauses before and after the word "bathroom" and outputs the word or a machine-generated utterance corresponding to the word, more slowly. Audio output that includes the second constituent (e.g., the clause "down the hall", presented in English) may also be generated, and subsequent audio input corresponding to the second constituent may be received. In some implementations, the order in which audio output representing each constituent is provided to an output device may be determined based on characteristics of the language in which the constituents are presented. For example, when presenting constituents in a language that is read from right to left, the audio data representing the constituents may be presented in an order in which the constituents occur in the phrase when read from right to left. As another example, when presenting constituents in a language where most sentences end with a verb, audio output corresponding to constituents that include verbs may be output subsequent to other constituents. In other implementations, the order in which the audio output representing each constituent is provided may be determined based on user data indicative of previous audio input received from the user. For example, if the user has provided previous audio input having a greater level of similarity to previous audio output when constituents containing the verb of a phrase are output first, the order in which the audio output representing each constituent is provided may include constituents that contain verbs prior to other constituents. In still other implementations, the order in which the audio output representing each constituent is provided may be determined in a random or pseudo-random manner. After receiving input from a user corresponding to one or more constituents, output may be generated that requests the user to input the initial phrase. For example, if a user successfully repeats the constituents "The bathroom is" and "Down the hall", the user may be prompted to attempt to combine the constituents and state the phrase.

In some implementations, audio output representative of constituents may be provided with various audio characteristics to indicate relationships between words, importance of words, user comprehension of words, and so forth. For example, a tone or frequency of speech that is output to a user may be increased or decreased to emphasize importance of a word. Similarly, the amplitude of speech that is output may be increased or decreased to emphasize or deemphasize particular words. Continuing the example, output speech stating the words "the bathroom" may deemphasize the word "the" by outputting the word with a lower amplitude or frequency, and emphasize the word "bathroom" by outputting the word with a greater amplitude or frequency. As another example, a rate at which speech is output may be used to indicate relationships between words. Continuing the example, output speech stating the words "down the hall" may increase the rate at which "the hall" is output, relative to the word "down", to emphasize the relationship between the words "the" and "hall". In other cases, pauses may be inserted between words to emphasize words of importance, such as pausing before outputting the word "hall". As yet another example, user data indicative of previous audio input received from a user may be used to determine particular words or relationships that are understood by the user, or words or relationships that may not be well understood. Portions of a constituent that are understood by the user may be output more rapidly or with lower frequency or amplitude, while portions that are not well understood by the user may be output more slowly or with higher frequency or amplitude. For example, user data may indicate that a user frequently provides incorrect user input regarding a particular type of subject-verb relationship. Based on this user data, audio output provided to the user may include pauses before and after portions of the output that include this relationship, or portions of the output that include this relationship may be output at a slower rate.

In some implementations, the output of a constituent to a user may be accompanied by a translation of the constituent in the user's native or preferred language. However, in some cases, due to linguistic differences, the direct translation of a constituent, outside of the context of the initial phrase, may not correspond to any portion of the initial phrase. For example, the English phrase "The bathroom is down the hall" may be translated to the Spanish phrase "El bano esta al fondo del pasillo". Translation of a first constituent, "the bathroom is", may yield the translation "el bano esta", which is found in the translated phrase. However, translation of a second constituent, "down the hall", may yield the translation "por el pasillo", which is not found in the translated phrase. In some implementations, a constituent may be translated to an alternate language, and correspondence between the translated constituent and the translated phrase may be determined. If the translated constituent is included in the translated phrase, an indication of the translated constituent may be included when the constituent is output to a user. If the translated constituent is not included in the translated phrase, an indication of the translated constituent may not be included when the constituent is output to the user.

As one skilled in the art will appreciate in light of this disclosure, certain embodiments may be capable of achieving certain advantages, including some or all of the following: Implementations described herein may generate comprehensible linguistic inputs (e.g., constituents) based on an initial phrase automatically, independent of the characteristics of the phrase or the language in which the phrase is presented. The constituents may be presented to a user in an unscripted manner, in real time, such as by using utterances received from a user. In such cases, no preexisting content generated or curated by an expert familiar with the selected language is necessary to facilitate the user's understanding of the constituents. For example, linguistic constituents may be generated nearly instantaneously after receiving speech from a user, based on the time at which the speech is received, the phrase data is accessed, and the phrase data is processed to determine the constituents. Even in cases where the direct translation of a selected phrase is not known, the phrase may be used to generate constituents for presentation to a user, without requiring the user to be knowledgeable regarding the vocabulary and grammatical structures included in the phrase. Automatic generation of comprehensible constituents from an initial phrase and presentation of the constituents to a user may facilitate acquisition of a language by the user without requiring use of scripted or pre-existing content related to linguistic instruction. Additionally, automatic generation of comprehensible constituents without use of scripted or expert-curated content may enable more efficient execution of simpler algorithms by computing devices, without requiring generation, maintenance, access, and searching of large databases of existing content. Further, use of a process that may generate constituents in an unscripted manner saves memory by avoiding a need to store pre-curated data and conserves bandwidth by generating and outputting shorter constituents when contrasted to pre-curated scripts. Providing a user with comprehensible constituents may also enable a user to acquire use of a language more efficiently, resulting in fewer repeated transmissions, processing of phrases, and other use of computing resources. Generation of comprehensible constituents also enable simplified user interfaces, both audible and visible, to be generated for use by a user to efficiently acquire a language.

FIG. 1 depicts an implementation of a system 100 for automatically converting a phrase that is input by a user 102 to comprehensible constituents for output to the user 102 in an alternate language. For example, a user 102 may provide user input 104 to a user device 106. In some implementations, the user input 104 may include speech. For example, FIG. 1 depicts the user input 104 as speech indicating a particular phrase and a selected language, such as "How do you say [phrase] in [language]?" In other implementations, the user input 104 may include text, interaction with one or more buttons or a touch interface, visual input such as movements detected by a camera or motion sensor, and so forth. While FIG. 1 depicts the user device 106 as a networked speaker, in other implementations, the user device 106 may include any number or any type of computing device, such as a smartphone, personal computer, portable computer, automotive computer, wearable computing device, set top box, and so forth. In some cases, the user device 106 may include separate input and output devices. For example, a user 102 may provide user input 104 using a smartphone, while a networked speaker device is used to output constituents to the user 102.

The user device 106 may communicate with one or more language servers 108 using one or more networks. While FIG. 1 depicts a single language server 108, in other implementations, the language server 108 may include any number and any type of computing devices, including without limitation the types of computing devices described with regard to the user device 106. The user device 106 may provide the user input 104 to the language server 108 for processing by an input processing module 110. The input processing module 110 may determine the indicated phrase and language based on the user input 104. For example, the input processing module 110 may be configured to determine the speech "How do you say" as a command to execute an application to transcribe the subsequent speech, such as by using a speech-to-text application or other type of speech recognition module, then determine constituents based on the speech. In other implementations, the input processing module 110 may be associated with the user device 106, which may determine the indicated phrase and language for transmission to the language server 108.

The input processing module 110 may determine phrase data 112(1) representative of the phrase determined from the user input 104 in the language used by the user 102. For example, the input processing module 110 may use speech-to-text processing to generate phrase data 112(1) that includes a text transcription of speech uttered by a user 102. In other implementations, the phrase data 112(1) may include audio data associated with the portion of the user input 104 that includes the phrase. In some implementations, the phrase data 112(1) may be provided to a translation module 114, which may translate the first phrase data 112(1) to the language indicated in the user input 104 to form second phrase data 112(2). While FIG. 1 depicts the translation module 114 associated with the language server 108, in other implementations, the translation module 114 may be associated with the user device 106, and the translated phrase data 112(2) may be provided from the user device 106 to the language server 108. In other implementations, an existing translation of the phrase data 112(1) may be determined without translating the phrase data 112(1) to the indicated language. In such cases, the translation module 114 may determine correspondence between the phrase data 112(1) and translation data that associates one or more portions of the phrase data 112(1) with corresponding translated phrases. In some implementations, a first portion of the phrase data 112(1) may be translated by the translation module 114 while a corresponding existing translation for a second portion of the phrase data 112(1) may be determined.

A parsing module 116 associated with the language server 108 may be used to determine constituent data 118 based on the translated phrase data 112(2). For example, the parsing module 116 may include a shift-reduce dependency parser or top-down syntax tree parsing algorithm to determine constituents (e.g., groups of related words) within the phrase represented by the phrase data 112(2). One example of a dependency parser may include "TurboParser", a dependency parser with linear programming, developed by Andre Martins of Carnegie Mellon University, described at https://github.com/andre-martins/TurboParser, which is incorporated by reference herein in its entirety. The phrase data 112(2) may represent the phrase determined from the user input 104, such as "The bathroom is down the hall". The parsing module 116 may determine dependency relationships between the individual words (e.g., tokens) of the phrase. For example, the noun/subject "bathroom" may depend from the verb "is", while the article "the" may depend from the noun "bathroom". The preposition "down" may depend from the verb "is", while the noun/object "hall" may depend from the preposition "down" and the article "the" may depend from the noun "hall". The resulting constituent data 118 may indicate multiple constituents determined from the phrase data 112(2), such as a first constituent, "the bathroom is", and a second constituent, "down the hall". While FIG. 1 depicts the parsing module 116 associated with the language server 108, in other implementations the parsing module 116 may instead be associated with the user device 106.

An output processing module 120 may generate output data 122 based on the constituent data 118. For example, output data 122 may include the constituents associated with the constituent data 118 arranged in a determined order and accompanied by additional speech or text, such as instructions to prompt a user 102 to repeat particular constituents. The output data 122 may be provided to the user device 106, which may process the output data 122 to generate output 124 for presentation to the user 102. In some implementations, the output 124 may include audio output, such as recorded or synthesized speech. In other implementations, the output 124 may include text or video data, such as images or videos depicting sign language. In response to the output 124, subsequent user input 104 may include speech repeating constituents or responding to other prompts presented in the output 124, which may be processed by the input processing module 110 to determine additional output 124 to be provided to the user 102. In other cases, subsequent user input 104 may include text, image data, or video data. For example, a user 102 may provide user input 104 using a keyboard, or image data indicating the movement of a user's mouth or the movement of a user's hands performing sign language or other gestures may be determined.

As discussed previously, while FIG. 1 depicts the input processing module 110, the translation module 114, the parsing module 116 and the output processing module 120 as being associated with the language server 108, in other implementations, one or more modules may instead be associated with the user device 106. For example, the user device 106 may process user input 104 received from the user 102 to generate phrase data 112(1), while the language server 108 translates the phrase data 112(1) and generates the output data 122. In some cases, each of the functions described with regard to the language server 108 may be performed by the user device 106 and use of a separate language server 108 may be omitted. In other implementations, multiple language servers 108 or other computing devices may be used to perform the functions of the input processing module 110, the translation module 114, the parsing module 116 and the output processing module 120. For example, a first computing device may determine the phrase data 112(2), a second computing device may determine the constituent data 118 based on the phrase data 112(2), and the first computing device (or a third computing device) may generate output data 122 based on the constituent data 118.

Figure 2:
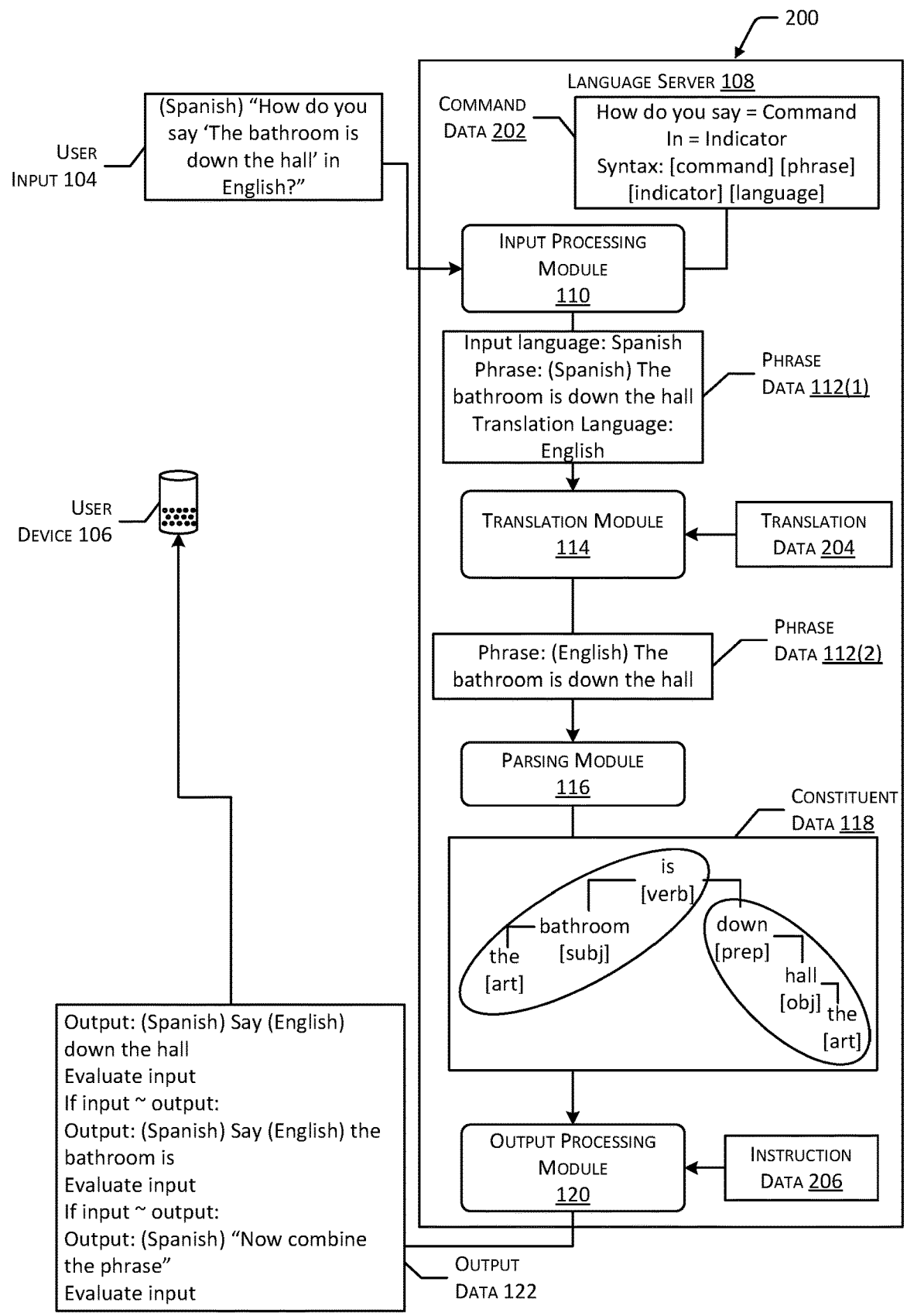
FIG. 2 depicts an implementation of a system for determining constituents based on an initial phrase and generating output based on the constituents.

FIG. 2 depicts an implementation of a system 200 for determining constituents based on an initial phrase and generating output 124 based on the constituents. As described with regard to FIG. 1, user input 104, such as speech, text, movement, or interaction with one or more input devices associated with a user device 106 may be transmitted from the user device 106 to a language server 108. An input processing module 110 associated with the language server 108 may analyze the user input 104 to determine the initial phrase input by the user 102 and the language into which the phrase is to be translated. For example, the user input 104 may include speech uttered by a user 102 in a first language (e.g., Spanish), such as "How do you say 'The bathroom is down the hall' in English?" The input processing module 110 may determine correspondence between the user input 104 and command data 202 that associates various applications, syntaxes, and so forth with user input 104. For example, the command data 202 may indicate that user input 104 consisting of the phrase "How do you say" constitutes a command to execute a language translation application, while the uttered speech "in" following the phrase indicates the language into which the phrase is to be translated. Continuing the example, FIG. 2 depicts the command data 202 indicating an example syntax of "[command] [phrase] [indicator] [language]", such that after receiving the command "How do you say", the subsequent speech "The bathroom is down the hall" will be determined to be a phrase to be translated, the speech "in" will be determined to indicate the requested language for translation, and the speech "English" will indicate the language into which the phrase is to be translated.

In some implementations, in response to the command represented by the speech "How do you say", the phrase data 112(1) may be provided to a translation module 114 associated with the language server 108. The phrase data 112(1) may indicate the phrase and the language determined from the user input 104, and the translation module 114 may translate the phrase data 112(1) into the determined language or determine an existing translation for at least a portion of the phrase data 112(1). In other implementations, the translation module 114 may be configured to translate received phrases into a predetermined language or group of languages or determine existing translations for the received phrases without using an indicated language determined from the user input 104. In some implementations, the phrase data 112(1) may include text representing the phrase. For example, the input processing module 110 may utilize speech to text technology to transcribe the speech representing the phrase into text. In other implementations, the phrase data 112(1) may include audio data representing the phrase. In still other implementations, the phrase data 112(1) may include image data or video data. For example, a user 102 may provide user input 104 in the form of sign language, which may be translated into a text output representing the phrase in a requested verbal or written language.

The translation module 114 may access translation data 204, which may associate speech or text in a first language with speech or text in a second language. For example, the translation data 204 may be used to determine an English translation for a Spanish phrase determined from the user input 104. The translation module 114 may generate phrase data 112(2) representing the translated phrase and may provide the phrase data 112(2) to a parsing module 116 associated with the language server 108. In some implementations, the phrase data 112(2) may include text. In other implementations, the phrase data 112(2) may include audio data, such as synthesized or recorded speech.

The parsing module 116 may generate constituent data 118 based on the phrase data 112(2) representing the translated phrase. In some implementations, the parsing module 116 may utilize a shift-reduce dependency parser or top-down syntax tree parsing algorithm to determine constituents (e.g., groups of related words) within the phrase represented by the phrase data 112(2). For example, the parsing module 116 may transform the language of the phrase into a syntax tree that indicates the dependency relationships between individual words (e.g., tokens) within the phrase. Continuing the example, FIG. 2 depicts the constituent data 118 representing the phrase "The bathroom is down the hall" as a syntax tree having the verb "is" at the root of the tree. The subject "bathroom" depends from the verb "is", while the article "the" depends from the subject "bathroom". The preposition "down" depends from the verb "is", the object "hall" depends from the preposition "down", and the article "the" depends from the object "hall". Based on the determined relationships between words, the parsing module 116 may determine one or more constituents within the phrase. For example, FIG. 2 depicts the constituent data 118 indicating two constituents: "the bathroom is" and "down the hall". The parsing module 116 may determine the constituents based on one or more rules or algorithms. For example, a rule may indicate that constituents having three words or fewer constitute comprehensible input, while larger constituents may not be comprehensible. As another example, a rule may indicate that particular types of complex linguistic relationships, such as prepositional phrases, are less comprehensible than subject and verb phrases, and as such, constituents that include prepositions may be limited to three words or fewer while other constituents may be larger. In some implementations, the constituents may be determined based on user data associated with the user device 106 or an associated user account. For example, a user 102 may historically provide correct responses to output 124 of constituents having a first type of relationship more frequently than to output 124 of constituents having a second type of relationship. Based on this determination, constituents having the first type of relationship may be generated having a larger number of words than constituents having the second type of relationship.

An output processing module 120 associated with the language server 108 may generate output data 122 based on the constituent data 118. The output processing module 120 may access instruction data 206 that includes additional text or speech for output with each constituent and indicates the times and the manner in which user input 104 (e.g., responses) to portions of the output 124 may be evaluated. For example, the output processing module 120 may determine a first constituent, "Down the hall", from the constituent data 118 and add additional language, such as the instruction "say" to the constituent, such that a first portion of the output data 122 may cause an output device to output the speech "Say: 'down the hall'". The output data 122 may then cause the user device 106 to await additional user input 104 in response to the first portion of the output 124, such as an attempt to repeat the constituent. The input processing module 110 may receive this additional user input 104 and determine correspondence between the additional user input 104 and the output data 122 or constituent data 118 representative of the repeated constituent. The output data 122 may cause the user device 106 to output multiple constituents, accompanied by instructions, and to prompt additional user input 104 in response to one or more of the constituents. In some cases, the received user input 104 may not correspond to the output data 122 or constituent data 118 within at least a threshold level of similarity. In such cases additional output data 122 may be generated to cause the user device 106 to prompt the user 102 to provide additional user input 104 corresponding to the output data 122 or constituent data 118. For example, if a user 102 mispronounces a word or repeats words of a constituent in an incorrect order, additional output data 122 that causes output of the constituent that includes pauses or other enhancements to facilitate user comprehension may be generated.

Figure 3:
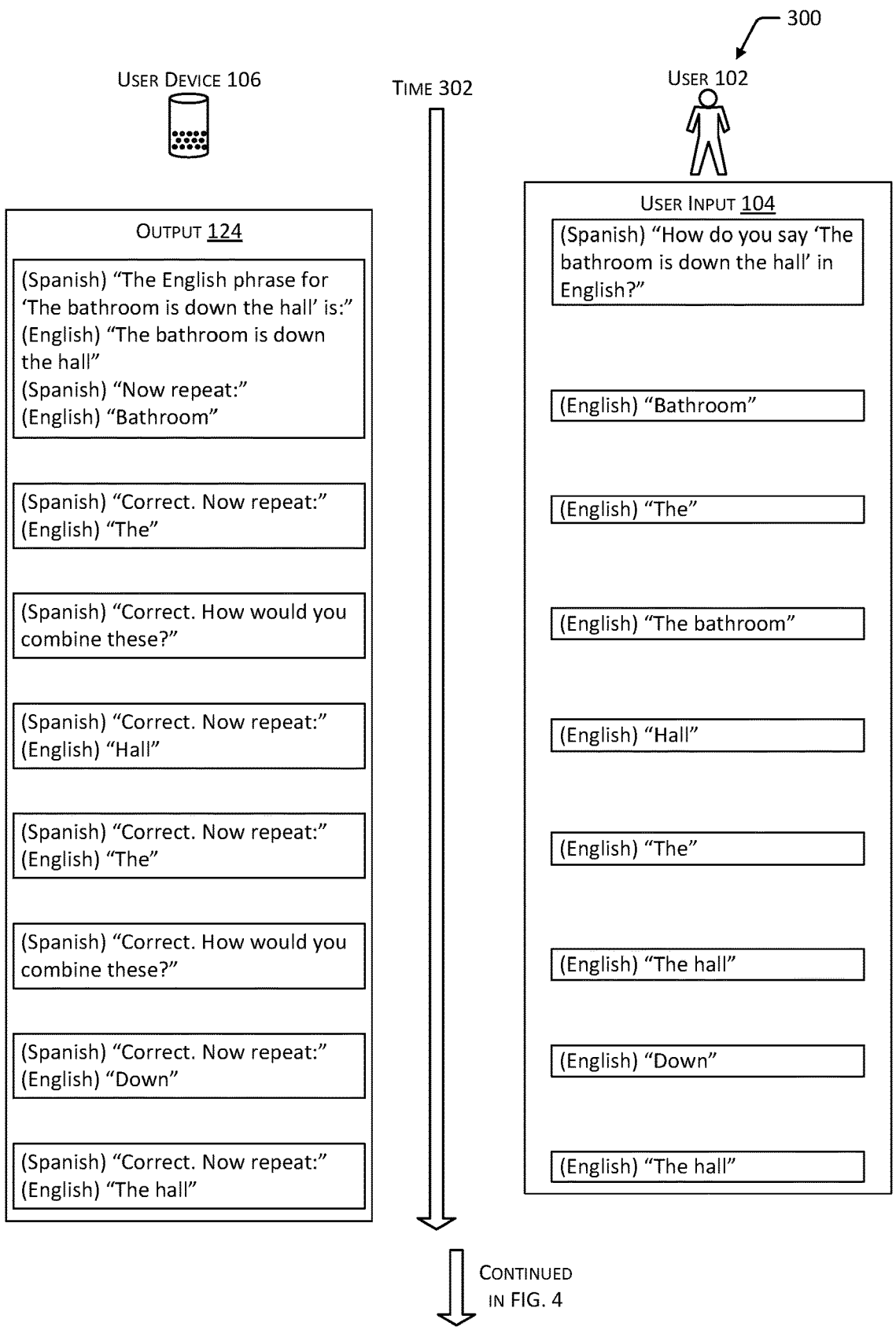
FIG. 3 is a block diagram depicting a first portion of example output and user input.
Figure 4:
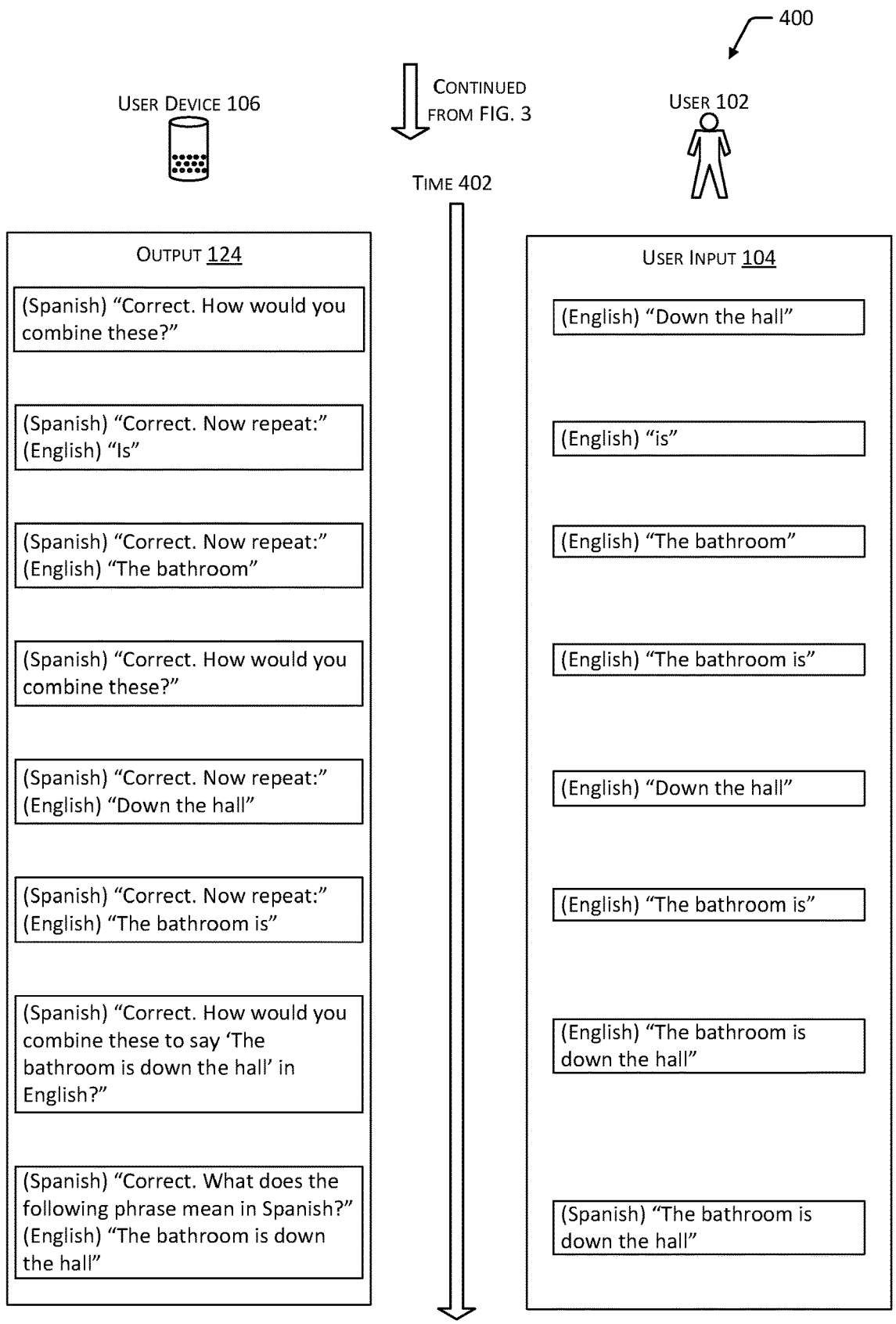
FIG. 4 is a block diagram depicting a second portion of example output and user input.

FIGS. 3 and 4 depict example implementations of output 124 from a user device 106 and additional user input 104 responding to multiple portions of the output 124. FIG. 3 is a block diagram 300 depicting a first portion of example output 124 and user input 104, and FIG. 4 is a block diagram 400 depicting a second portion of example output 124 and user input 104. The arrow 302 shown in FIG. 3 indicates the passage of time as user input 104 is provided in response to output 124. The arrow 402 shown in FIG. 4 also indicates the passage of time as user input 104 is provided in response to output 124. Based on the user responses to each portion of the output 124, additional output 124 from the user device 106 may be determined. In some implementations, correspondence between the user input 104 and an expected (e.g., correct) response to a portion of the output 124 may be determined by the user device 106. In other implementations, the additional user input 104 may be provided to the language server 108, and correspondence between the user input 104 and the expected response to the output 124 may be determined by the language server 108.

FIG. 3 depicts initial user input 104 including the Spanish sentence "How do you say 'The bathroom is down the hall' in English?". As described with regard to FIG. 2, an input processing module 110 may determine, based on this user input 104, a command to determine a translation of a requested phrase and provide phrase data 112(1) indicative of the phrase and translated language, determined from the user input 104, to the translation module 114. The translation module 114 may translate the phrase data 112(1) or determine an existing translation to form translated phrase data 112(2), and the parsing module 116 may determine constituent data 118 based on the translated phrase data 112(2). The output processing module 120 may generate output data 122 based on the constituent data 118, which may be provided to an output device associated with the user device 106 for generation of the output 124. Continuing the example, the initial output 124 responsive to the initial user input 104 may include an indication of the translated phrase data 112(2) and prompt instructing the user 102 to repeat a particular token or constituent included in the translated phrase.

The output 124 may include multiple prompts for additional user input 104, such as prompts that request the user 102 to repeat particular tokens (e.g., words) or constituents (e.g., groups of related words). For example, FIG. 3 depicts example output 124 requesting the user 102 to repeat the token "bathroom", the token "the", the token "hall", the token "the", and the token "down". In some implementations, the output 124 may include prompts requesting the user 102 to combine tokens or constituents rather than repeat portions of the output 124. For example, FIG. 3 depicts the output 124 including a prompt requesting the user 102 to attempt to combine the tokens "bathroom" and "the" and a prompt requesting the user to combine the tokens "hall" and "the". After each prompt included in the output 124, the user device 106 or the language server 108 may receive user input 104 responsive to the prompt and determine correspondence between the user input 104 and a portion of the output data 122 or constituent data 118 representing an expected response from the user 102. For example, in response to a prompt to repeat the token "bathroom", user input 104 including speech repeating the word "bathroom" may be received. The user device 106 or language server 108 may determine correspondence between the received user input 104 and the portion of the output data 122 or constituent data 118 representing the token "bathroom". If the user input 104 deviates from the output data 122 or constituent data 118 by at least a threshold amount, additional output 124 may be generated prompting the user to repeat the token again. In some implementations, the additional output 124 may be modified to facilitate user understanding of a token or constituent. For example, if a user 102 mispronounces a word, the subsequent output 124 may include pauses before and after the mispronounced word. If the user input 104 corresponds to the output data 122 or constituent data 118, additional output 124 indicating the correspondence and prompting the user 102 to repeat a subsequent token or constituent or to combine previous tokens or constituents may be generated.

For example, FIG. 4 depicts the output 124 including a prompt requesting the user to attempt to combine the token "down" with the constituent "the hall". Subsequent to a correct response to this prompt, the output 124 includes a prompt requesting the user 102 to repeat the token "is", a prompt requesting the user 102 to repeat the constituent "the bathroom", and a prompt requesting the user 102 to attempt to combine the token "is" with the constituent "the bathroom". The output 124 is further depicted including prompts requesting the user 102 to repeat the constituent "down the hall" and to repeat the constituent "the bathroom is". In some implementations, after at least a portion of the constituents determined from a phrase have been output to a user 102, the output 124 may include a prompt requesting the user 102 to input the initial phrase in the requested language. For example, FIG. 4 depicts the output 124 including a prompt requesting the user 102 to combine multiple constituents to say the phrase "The bathroom is down the hall" in English, and a subsequent prompt requesting the user 102 to repeat the meaning of the translated phrase in Spanish.

Figure 5:
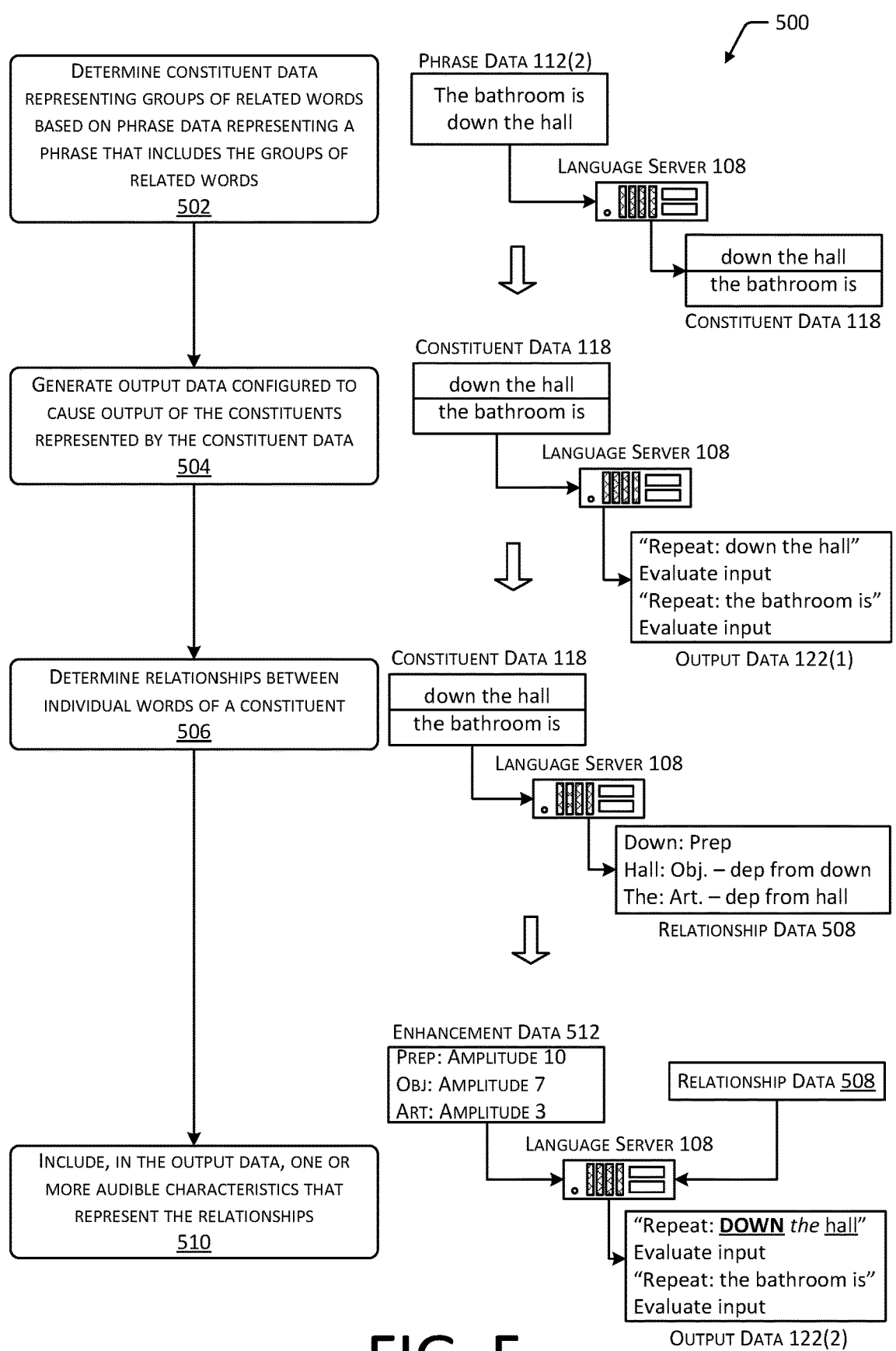
FIG. 5 is a scenario depicting a method for modifying output presented to a user based on relationships between words within linguistic constituents.

FIG. 5 is a scenario 500 depicting a method for modifying output 124 presented to a user 102 based on relationships between words within linguistic constituents. At 502, constituent data 118 representing groups of related words (e.g., tokens) may be determine based on phrase data 112(2) representing a phrase that includes the groups of related words. For example, FIG. 5 depicts the phrase data 112(2) representing the phrase "The bathroom is down the hall". Based on the phrase data 112(2), one or more language servers 108 may determine constituent data 118 representing multiple groups of words included within the phrase represented by the phrase data 112(2). For example, FIG. 5 depicts the constituent data 118 representing two constituents: "down the hall" and "the bathroom is".

At 504, output data 122(1) may be generated. The output data 122(1) may be configured to cause output of the constituents represented by the constituent data 118. For example, the output data 122(1) may be configured to cause an output device associated with the user device 106 to output one or more of speech or text representing the constituents to a user 102, along with associated instructions, such as prompts to repeat particular tokens or constituents or attempt to combine one or more tokens or constituents. For example, FIG. 5 depicts output data 122(1) configured to cause a user device 106 to output the instructions "repeat: down the hall", evaluate subsequent user input 104, output the instructions "repeat: the bathroom is", and evaluate subsequent user input 104.

At 506, relationships between individual words of one or more of the constituents may be determined. For example, as described with regard to FIG. 2, possible relationships between words may include subject-verb dependencies, noun-article dependencies, verb-preposition dependencies, preposition-object dependencies, and so forth. Continuing the example, the constituent "down the hall" includes a preposition "down", an object "hall" that depends from the preposition "down", and an article "the" that depends from the object "hall". The language server 108 may determine relationship data 508 indicative of the relationships (e.g., dependencies) between individual words within a constituent.

At 510, the language server 108 may include, in the output data 122, one or more audible characteristics that represent the relationships indicated in the relationship data 508. For example, the language server 108 may determine correspondence between the relationship data 508 and enhancement data 512 that associates particular relationships or characteristics of tokens or constituents with one or more audible characteristics. Continuing the example, FIG. 5 depicts the enhancement data 512 indicating different amplitudes to be associated with particular words based on the relationship of the words to other words within the constituent. Specifically, the depicted enhancement data 512 associates a high amplitude with the preposition "down", a moderate amplitude with the object "hall", and a low amplitude with the article "the", such that the resulting output 124 may emphasize the importance of the words "down" and "hall" and deemphasize the importance of the word "the" based on the volume with which the words are output.

In other implementations, the enhancement data 512 may associate different frequencies (e.g., tones or pitches) with different portions of a constituent. In still other implementations, the enhancement data 512 may associate different rates of output with different portions of a constituent based on the relationship represented by each portion of the constituent. For example, related groups of words, such as "the hall" may be spoken more rapidly to emphasizes the relationship between the words, while pauses or slower rates of output may be used to indicate unrelated words or words having a different type of relationship.

In other implementations, the characteristics applied to the output 124 may be determined based on characteristics of the language represented by the output 124 in addition to or in lieu of the relationships between the words of a constituent. For example, certain languages may include grammatical conventions in which articles are omitted, or a sentence structure in which sentences primarily terminate with a verb. Based on these linguistic characteristics, certain types of words or relationships may be emphasized or deemphasized based on the amplitude, frequency, or rate associated with the output 124 of the words. In still other implementations, the characteristics applied to the output 124 may be determined based on user data associated with a user 102, user device 106, or user account. For example, a user 102 may historically demonstrate comprehension of prepositional phrases based on responses to output 124, but may demonstrate a lack of comprehension of subject-verb agreement. Based on user data indicating these user characteristics, prepositional phrases within the output 124 may be deemphasized or output at a faster rate, while subjects and verbs may be emphasized and output at a slower rate. As another example, user input 104 repeating a constituent, in response to output 124 may fail to correspond to expected user input 104 within a threshold level of similarity. In such a case, additional output 124 may be generated that includes audible characteristics associated with the previous user input 104. Continuing the example, if a user 102 repeating the constituent "The bathroom is" mispronounces the word "bathroom", subsequent output 124 prompting the user 102 to repeat the constituent may include the insertion of pauses before and after the word "bathroom" to facilitate comprehension.

While FIG. 5 describes use of audible characteristics to emphasize or deemphasize portions of output 124, in other implementations, visible characteristics, such as modifications to visible text or modifications to video output, such as sign language, may be used to emphasize or deemphasizes portions of a visible output 124.

Figure 6:
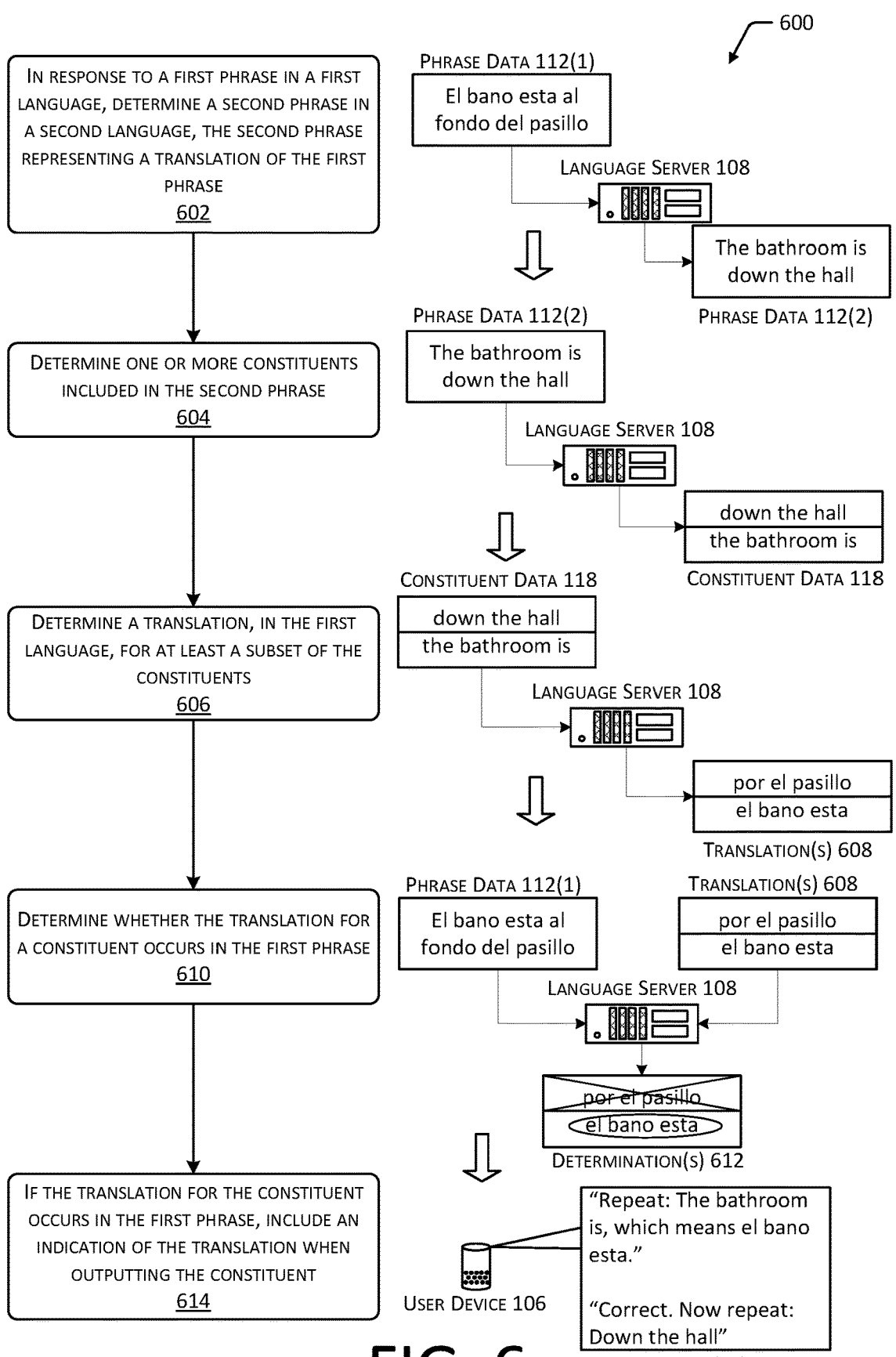
FIG. 6 is a scenario illustrating a method for adding translations of constituents in a user's original language to output provided to a user.

FIG. 6 is a scenario 600 illustrating a method for adding translations of constituents in a user's original language to output 124 provided to a user 102. At 602, in response to a first phrase in a first language, a second phrase in a second language may be determined, the second phrase representing a translation of the first phrase. For example, a user 102 may provide user input 104 indicating a first phrase in an input language, such as Spanish. The language server 108 may determine phrase data 112(1) based on the user input 104. The language server 108 may then translate the phrase represented by the phrase data 112(1) to form phrase data 112(2) representing the translated phrase in a target language, such as English. In other implementations, the language server 108 may determine an existing translation of the phrase data 112(1), which may be represented by the phrase data 112(2). For example, FIG. 6 depicts the first phrase data 112(1) indicating the Spanish phrase "El bano esta al fondo del pasillo" and the second phrase data 112(2) indicating the English translation "The bathroom is down the hall".

At 604, one or more constituents included in the second phrase may be determined. For example, as described with regard to FIGS. 1-2, the language server 108 may determine constituent data 118 based on the phrase data 112(2). The constituent data 118 may represent constituents, each constituent including a group of related words. For example, FIG. 6 depicts two example constituents, "down the hall" and "the bathroom is", determined based on the phrase "The bathroom is down the hall".

At 606, one or more translations 608, in the first language, may be determined for at least a subset of the constituents represented by the constituent data 118. For example, a translation module 114 may be used to determine the translation 608 for one or more of the individual constituents. In some cases, depending on the language associated with the user input 104 and the language associated with the phrase data 112(2), a direct translation of a constituent, in the absence of the context of an entire phrase, may not include language contained within the phrase. For example, FIG. 6 depicts a Spanish translation 608 of "por el pasillo" for the English constituent "down the hall", however the phrase represented by the phrase data 112(1) instead includes the language "al fondo del pasillo" rather than "por el pasillo". In other cases, a direct translation of a constituent may include language contained within the phrase. For example, FIG. 6 depicts a Spanish translation 608 "el bano esta" for the English constituent "the bathroom is", which is included in the initial phrase represented by the phrase data 112(1). In other implementations, translations 608 may be determined for individual words included in the constituents. For example, if it is determined that the translation 608 for a particular constituent is not included in the initial phrase, translations 608 for portions of the constituent or individual words of the constituent may be determined.

At 610, a determination 612 may be made indicating whether the translation 608 for a constituent is included in the initial phrase. For example, correspondence between the phrase data 112(1) and the translations 608 may indicate that the translation 608 "por el pasillo" is not included in the phrase data 112(1) while the translation "el bano esta" is included in the phrase data 112(1).

At 614, when output 124 is provided by a user device 106, if the translation 608 for the constituent occurs in the first phrase, an indication of the translation 608 may be included when outputting the constituent. If the translation 608 for the constituent does not occur in the first phrase, an indication of the translation 608 may not be included when outputting the constituent. For example, FIG. 6 depicts the output 124 presenting the constituent "down the hall" without presenting a corresponding translation 608 because the translation 608 "por el pasillo" did not occur in the initial phrase. However, the output 124 is shown presenting the constituent "the bathroom is" accompanied by an indication of the translation 608 "el bano esta" because the translation 608 occurs in the initial phrase.

Figure 7:
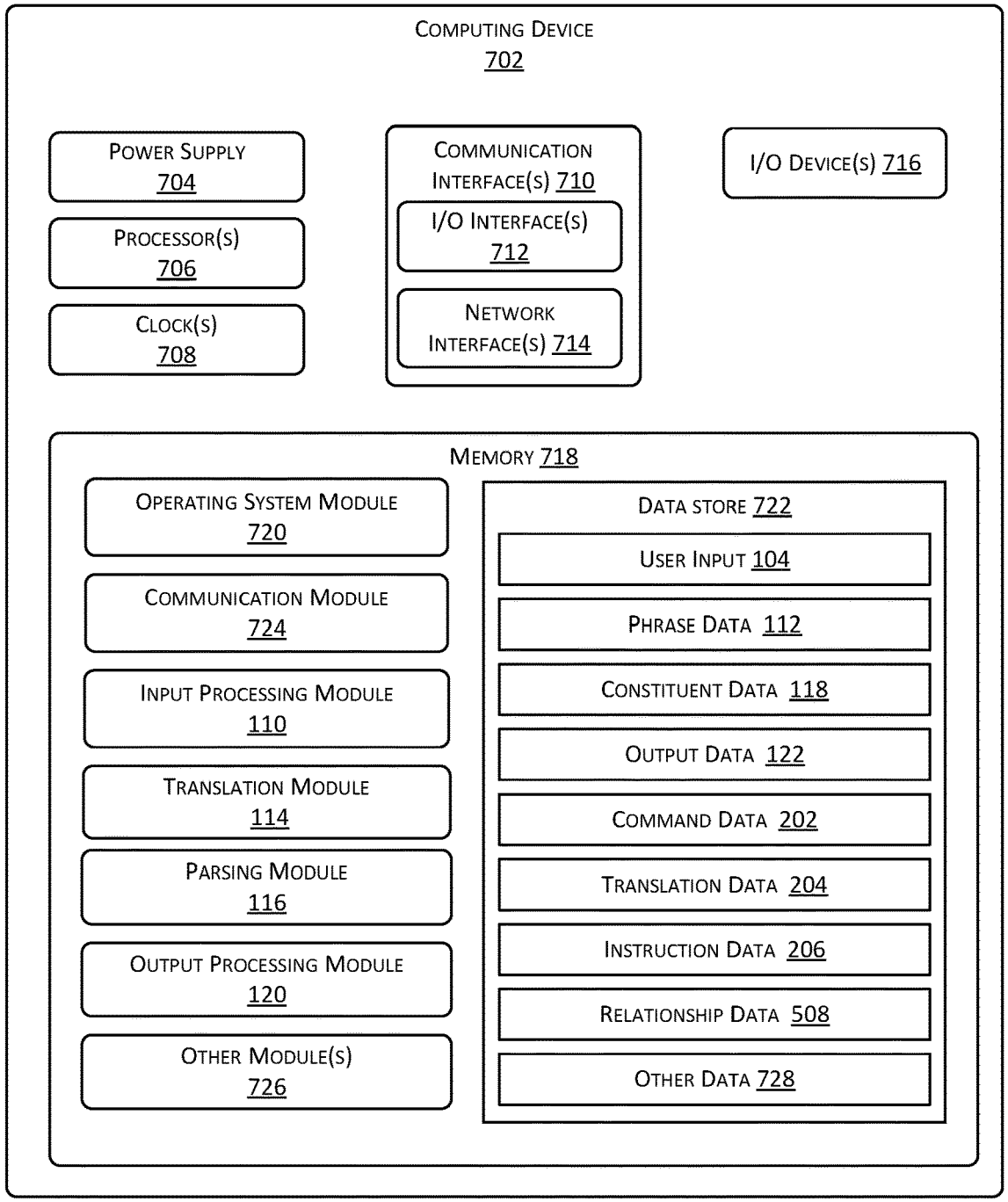
FIG. 7 is a block diagram illustrating a computing device within the scope of the present disclosure.

FIG. 7 is a block diagram 700 illustrating a computing device 702 within the scope of the present disclosure. The computing device 702 may include one or more language servers 108, one or more user devices 106, or one or more other computing devices 702 in communication with a user device 106 or language server 108. While FIG. 7 depicts a single block diagram 700 representative of a computing device 702, any number of networked computing devices 702 may perform the implementations described herein. For example, a first portion of the functions described herein may be performed by a user device 106, while a second portion of the functions are performed by one or more language severs 108 or other computing devices 702 in communication with the user device 106.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clocks 708 may provide information indicative of date, time, ticks, and so forth. For example, the processor(s) 706 may use data from the clock 608 to generate a timestamp, trigger a preprogrammed action, and so forth.

The computing device 702 may include one or more communication interfaces 710, such as input/output (I/O) interfaces 712, network interfaces 714, and so forth. The communication interfaces 710 may enable the computing device 702, or components of the computing device 702, to communicate with other computing devices 702 or components of the other computing devices 702. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O devices 716. The I/O devices 716 may include any manner of input device or output device associated with the computing device 702. For example, I/O devices 716 may include touch sensors, keyboards, mouse devices, microphones, image sensors (e.g., cameras), scanners, displays, speakers, haptic devices, printers, and so forth. In some implementations, the I/O devices 716 may be physically incorporated with the computing device 702 or may be externally placed.

The network interfaces 714 may be configured to provide communications between the computing device 702 and other devices, such as the I/O devices 716, routers, access points, and so forth. The network interfaces 714 may include devices configured to couple to one or more networks including local area networks (LANs), wireless LANs (WLANs), wide area networks (WANs), wireless WANs, and so forth. For example, the network interfaces 714 may include devices compatible with Ethernet, Wi-Fi, Bluetooth, ZigBee, Z-Wave, 3G, 4G, LTE, and so forth.

The computing device 702 may include one or more busses or other internal communications hardware or software that allows for the transfer of data between the various modules and components of the computing device 702.

As shown in FIG. 7, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 722 and one or more of the following modules may also be associated with the memory 718. The modules may be executed as foreground applications, background tasks, daemons, and so forth. The data store(s) 722 may use a flat file, database, linked list, tree, executable code, script, or other data structure to store information. In some implementations, the data store(s) 722 or a portion of the data store(s) 722 may be distributed across one or more other devices including other computing devices 702, network attached storage devices, and so forth.

The communication module 724 may be configured to establish communications with one or more other computing devices 702. Communications may be authenticated, encrypted, and so forth.

The memory 718 may also store the input processing module 110. The input processing module 110 may be configured to receive user input 104 and determine phrase data 112 based on the user input 104. For example, based on correspondence between command data 202 and the user input 104, a command to execute the translation module 114 may be determined. The command data 202 may also indicate a syntax for determining an initial phrase and an indication of a translation language based on the user data 104. In some implementations, the input processing module 110 may also determine an input language associated with the user input 104. For example, the user input 104 may include speech or text presented using a first language, such as Spanish, and may request that a phrase be translated to a second language, such as English. The input processing module 110 may also receive user input 104 in response to portions of the output 124 provided to a user 102. For example, the input processing module 110 may receive user input 104 representing a user's attempt to repeat a word, phrase, or constituent or a user's attempt to combine words or constituents. In some implementations, the input processing module 110 may use speech to text processing to generate alphanumeric data based on speech received from a user 102.

The memory 718 may additionally store the translation module 114. In some implementations, the translation module 114 may access translation data 204 to translate the phrase determined from the user input 104 from a first language to a second language. In other implementations, the translation module 114 may determine an existing translation of the phrase determined from the user input 104. In some cases, the user input 104 may indicate the second language into which the phrase is to be translated. In other implementations, the translation module 114 may be configured to translate received phrases into one or more preselected languages or determine existing translations for the preselected language(s). In some implementations, as described with regard to FIG. 6, the translation module 114 may also be used to translate constituents or individual words within a phrase, which may be included in output 124 presented to a user 102 if the translations 608 are included in the initial phrase determined from the user input 104.

The memory 718 may also store the parsing module 116. The parsing module 116 may determine constituent data 118 based on phrase data 112 representing a translated phrase. In some implementations, the parsing module 116 may include a shift-reduce dependency parser or top-down syntax tree parsing algorithm. For example, the parsing module 116 may determine constituent data 118 that represents a tree structure or other indication of dependency relationships between individual words (e.g., tokens) within a phrase. The parsing module 116 may also determine one or more constituents (e.g., groups of related words) based on the determined relationships.

The memory may further store the output processing module 120. The output processing module 120 may generate output data 122 based on the determined constituent data 118 and instruction data 206. The instruction data 206 may include instructions, rules, and so forth for augmenting the determined constituents. For example, the output data 122 may include the determined constituents, each of which may be associated with an instruction, such as a prompt for soliciting user repetition of the constituent, determined based on the instruction data 206. In some implementations, the output processing module 120 may use text to speech technology to generate synthesized or recorded speech based on alphanumeric data representing determined constituents and other text associated with the instruction data 206. The output processing module 120 may also access relationship data 508 indicative of the determined relationships represented in the constituent data 118 and enhancement data 512 that associates output characteristics with various relationships. Based on the relationship data 508 and enhancement data 512, the output processing module 120 may affect the amplitude, frequency, rate, or other audible or visible characteristics of the output 124 generated based on the output data 122. As discussed previously with regard to FIG. 5, the output processing module 120 may determine an amplitude, frequency, rate, insertion of pauses, or other audible or visible characteristics of the output 124 based on other circumstances, such as user input 104 received in response to output 124, user data indicative of previous user input 104 received from a user 102, characteristics of a particular language, and so forth. In some cases, as described with regard to FIG. 6, the output processing module 120 may also associate one or more translations 608 with the output of particular constituents if the translation 608 for the constituent is included in the initial phrase determined from the user input 104.

Other modules 726 may also be present in the memory 718. For example, encryption modules may be used to encrypt and decrypt communications between computing devices 702. Authentication modules may be used to authenticate communications sent or received by computing devices 702.

Other data 728 within the data store(s) 722 may include user input data, such as configurations and settings associated with computing devices 702. Other data 728 may include encryption keys and schema, access credentials, and so forth. Other data 728 may also include rules and configurations for determining constituents based on phrase data 112 of for providing output data 122 with audible or visible characteristics based on user data, characteristics of a language, or relationship data 508. Other data 728 may further include user data indicative of previous user input 104 received from a particular user 102, user device 106, or user account, which may indicate a user's comprehension of certain constituents, relationships, and so forth.

In different implementations, different computing devices 702 may have different capabilities or capacities. For example, language servers 108 may have greater processing capabilities or data storage capacity than user devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving first speech in a first language, wherein the first speech includes a first phrase for translation to a second language;
determining a second phrase that includes a translation of the first phrase in the second language;
processing the second phrase using a dependency parser to determine at least a first constituent that includes a first plurality of words associated by one or more first grammatical relationships and a second constituent that includes a second plurality of words associated by one or more second grammatical relationships;
generating first audio output that includes the first constituent presented in the second language;
receiving second speech representing the first constituent in the second language;
determining first correspondence between the second speech and the first audio output, the first correspondence indicating audible similarity between the second speech and the first audio output;
generating second audio output that includes the second constituent presented in the second language;
receiving third speech representing the second constituent in the second language;
determining second correspondence between the third speech and the second audio output, the second correspondence indicating audible similarity between the third speech and the second audio output; and
generating third audio output that indicates the first correspondence and the second correspondence.

2. The method of claim 1, further comprising:
generating fourth audio output including a prompt requesting speech that includes the second phrase in the second language;
receiving fourth speech representing the second phrase in the second language;
determining third correspondence between the fourth speech and the second phrase, the third correspondence indicating audible similarity between the fourth speech and the second phrase; and
including an indication of the third correspondence in the third audio output.

3. The method of claim 1, further comprising:
translating the first constituent from the second language to the first language to form a first translation;
determining third correspondence between the first translation and a portion of the second phrase that corresponds to the first constituent, the third correspondence indicating similarity between the first translation and the portion of the second phrase; and
including an indication of the first translation in the first audio output.

4. The method of claim 1, further comprising:
determining one or more of a random order or a pseudo-random order for providing the first audio output and the second audio output to a user device.

5. A system comprising:
one or more memories storing computer-executable instructions; and
one or more hardware processors to execute the computer-executable instructions to:
access a phrase that includes one or more of text or speech presented in a first language;
determine, based on the phrase, a first constituent that includes one or more first words and a second constituent that includes one or more second words;

generate first data that represents the first constituent in the first language;
provide the first data to an output device;
receive first input from an input device;
determine first correspondence between the first input and the first data, wherein the first correspondence indicates a level of similarity between the first input and the first data;
generate second data that represents the second constituent in the first language;
provide the second data to the output device;
receive second input from the input device;
determine second correspondence between the second input and the second data, wherein the second correspondence indicates a level of similarity between the second input and the second data; and
generate output indicative of the first correspondence and the second correspondence.

6. The system of claim 5, further comprising computer-executable instructions to:
receive third input from the input device, wherein the third input represents the phrase;
determine third correspondence between the third input and the phrase; and
include an indication of the third correspondence in the output.

7. The system of claim 5, further comprising computer-executable instructions to:
determine, based on the first correspondence, that the level of similarity between the first input and a portion of the first data is less than a threshold similarity;
provide third data to the output device, wherein the third data indicates a request for third input corresponding to the first constituent and includes one or more of an audible characteristic or a visible characteristic associated with a portion of the third data that corresponds to the portion of the first data;
receive third input from the input device;
determine third correspondence between the third input and the first data, wherein the third correspondence indicates a level of similarity between the third input and the first data;
determine, based on the third correspondence, that the level of similarity between the third input and the first data is greater than or equal to the threshold similarity; and
include an indication of the third correspondence in the output.

8. The system of claim 5, further comprising computer-executable instructions to:
access user data associated with one or more of the input device or the output device, wherein the user data indicates a second language associated with a user of the one or more of the input device or the output device;
determine a translated phrase that includes a translation of the phrase in the second language;
translate the first constituent from the first language to the second language to form a translated constituent;
determine that the translated constituent corresponds to a portion of the translated phrase with at least a threshold level of similarity; and
include an indication of the translated constituent in the first data.

9. The system of claim 5, further comprising computer-executable instructions to:
access user data associated with one or more of the input device or the output device, wherein the user data indicates previous correspondence between previous input and previous output for data presented in a first order and data presented in a second order;
determine, based on the user data, that the previous correspondence indicates a greater level of similarity between the previous output and the previous data for the first order; and
provide the first data to the output device prior to providing the second data to the output device based on the first order.

10. The system of claim 5, further comprising computer-executable instructions to:
determine one or more of a random order or a pseudo-random order for providing the first data and the second data to the output device; and
provide the first data to the output device prior to providing the second data to the output device based on the one or more of the random order or the pseudo-random order.

11. The system of claim 5, further comprising computer-executable instructions to:
determine a relationship between the one or more first words;
access enhancement data that associates relationships with audible characteristics;
determine, based on correspondence between the relationship and the enhancement data, one or more of an audible characteristic or a visible characteristic that corresponds to the relationship; and
include the one or more of the audible characteristic or the visible characteristic in the first data.

12. The system of claim 11, wherein the audible characteristic includes one or more of a pause, an output rate, an output frequency, or an output amplitude.

13. A method comprising:
accessing a first phrase that includes one or more of text or speech presented in a first language, wherein the first phrase includes a first plurality of words;
determining, based on the first plurality of words, a first constituent that includes one or more first words of the first plurality of words;
determining a second phrase including a second plurality of words, wherein the second phrase represents a translation of the first phrase in a second language;
translating the first constituent to the second language to form a second constituent that includes one or more second words;
determining that the one or more second words correspond to the second plurality of words with at least a threshold level of similarity;
generating first output that includes the first constituent and an indication of the second constituent;
receiving first input from an input device;
determining first correspondence between the first input and the first output, wherein the first correspondence indicates a level of similarity between the first input and the first output; and
generating second output indicative of the first correspondence.

14. The method of claim 13, further comprising:
determining, based on the first plurality of words, a third constituent that includes one or more third words of the first plurality of words;
generating third output that includes the third constituent;
receiving second input from the input device;
determining second correspondence between the second input and the third output, wherein the second correspondence indicates a level of similarity between the second input and the third output; and including an indication of the second correspondence in the second output.

15. The method of claim 14, further comprising:

generating fourth output that includes a request for input representing the second phrase;

receiving third input that represents the second phrase;

determining third correspondence between the third input and the second phrase, wherein the third correspondence indicates a level of similarity between the third input and the second phrase; and including an indication of the third correspondence in the second output.

16. The method of claim 14, further comprising:

accessing user data that indicates previous correspondence between previous audio input and previous audio data generated for output;

determining, based on the user data, an order for providing the first output and the third output to an output device; and providing the first output prior to providing the third output based on the order.

17. The method of claim 14, further comprising:

determining a characteristic of the first language;

accessing language data that associates characteristics with orders for outputting portions of the second phrase;

determining, based on correspondence between the characteristic and the language data, an order for providing the first output and the third output to an output device; and providing the first output prior to providing the third output based on the order.

18. The method of claim 13, further comprising:

determining, based on the first correspondence, that the level of similarity between the first input and the first output is less than a threshold similarity;

receiving second input from the input device; and determining second correspondence between the second input and the first output, wherein the second correspondence indicates that a level of similarity between the second input and the first output is greater than or equal to the threshold similarity.

19. The method of claim 13, wherein one or more of the first input or the first output is generated based on one or more of image data or video data.

20. The method of claim 13, further comprising:

determining a relationship between the first plurality of words; and including, in the first output, one or more of an audible characteristic or a visible characteristic that indicates the relationship.

* * * * *

UNITED STATES PATENT AND TRADEMARK OFFICE
CERTIFICATE OF CORRECTION

PATENT NO. : 10,726,211 B1
APPLICATION NO. : 16/017816
DATED : July 28, 2020
INVENTOR(S) : Nikolas Wolfe et al.

Page 1 of 1

It is certified that error appears in the above-identified patent and that said Letters Patent is hereby corrected as shown below:

In the Claims
Column 20, Claim 9, Line 6:
Currently reads: "between the previous output and the previous data for".
Where it should read: --between the previous input and the previous output for--.

Signed and Sealed this
First Day of September, 2020

Andrei Iancu
*Director of the United States Patent and Trademark Office*